United States Patent [19]

Chung et al.

[11] Patent Number: 5,136,443
[45] Date of Patent: Aug. 4, 1992

[54] CASSETTE LOADING APPARATUS FOR DIGITAL AUDIO TAPE RECORDER

[75] Inventors: Seok P. Chung; Byung C. Lim, both of Kyungki; Seung H. Yoo, Seoul, all of Rep. of Korea

[73] Assignee: Goldstar Co., Ltd., Seoul, Rep. of Korea

[21] Appl. No.: 713,707

[22] Filed: Jun. 11, 1991

Related U.S. Application Data

[63] Continuation of Ser. No. 273,412, Nov. 18, 1988, Pat. No. 5,060,094.

[30] Foreign Application Priority Data

Nov. 20, 1987 [KR] Rep. of Korea ............... 20107/1987
Dec. 31, 1987 [KR] Rep. of Korea ............... 24574/1987
Apr. 29, 1988 [KR] Rep. of Korea ................ 6198/1988
Apr. 29, 1988 [KR] Rep. of Korea ................ 6199/1988

[51] Int. Cl.$^5$ ............................................. G11B 5/008
[52] U.S. Cl. ...................................................... 360/96.5
[58] Field of Search ........................... 360/96.5, 96.6; 242/197–201

[56] References Cited

U.S. PATENT DOCUMENTS 5,032,939 7/1991 Mihara ......................... 360/96.5

Primary Examiner—A. J. Heinz
Attorney, Agent, or Firm—Rosen, Dainow & Jacobs

[57] ABSTRACT

A cassette front loading apparatus for DAT of tray type which loads and unloads a cassette by moving horizontally and vertically is disclosed. Without utilizing separately the loading motor and the lift and drop motor for moving the cassette horizontally and lifting and dropping the same, with existing capstan motor only, the loading and unloading operation including the horizontal and vertical movement, slider opening movement, cassette take out movement and location detecting operation and the like are executed. Accordingly, the loading motor and the lift and drop motor and the number of parts are deleted, consequently all of the mechanism is very much simplified, therefore the preciseness and the durability are expected to be enhanced. Since all of the mechanism is simplified, the cost of the product is decreased and the assembling process became easier simultaneously the productivity is remarkably increased.

10 Claims, 16 Drawing Sheets

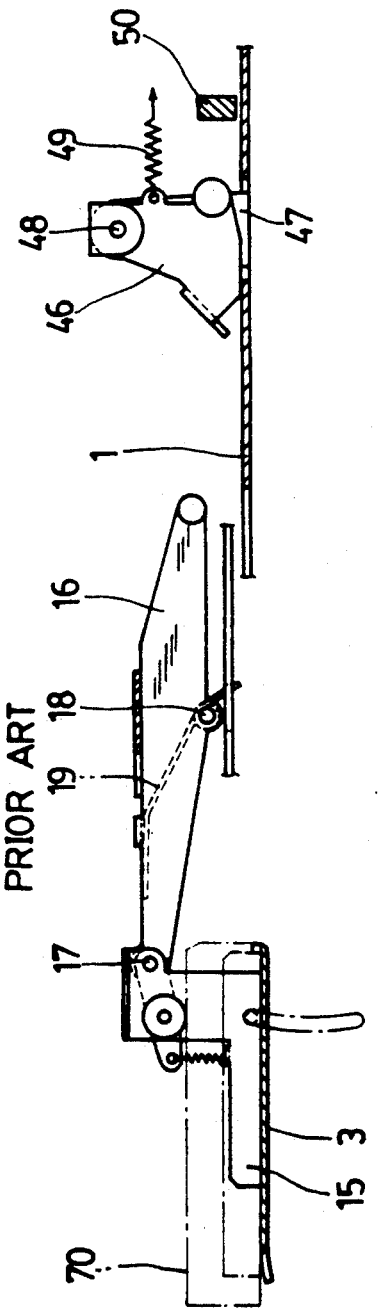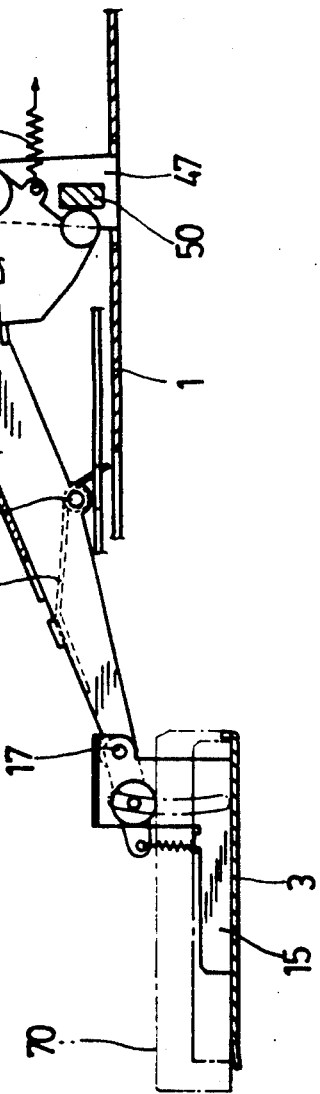

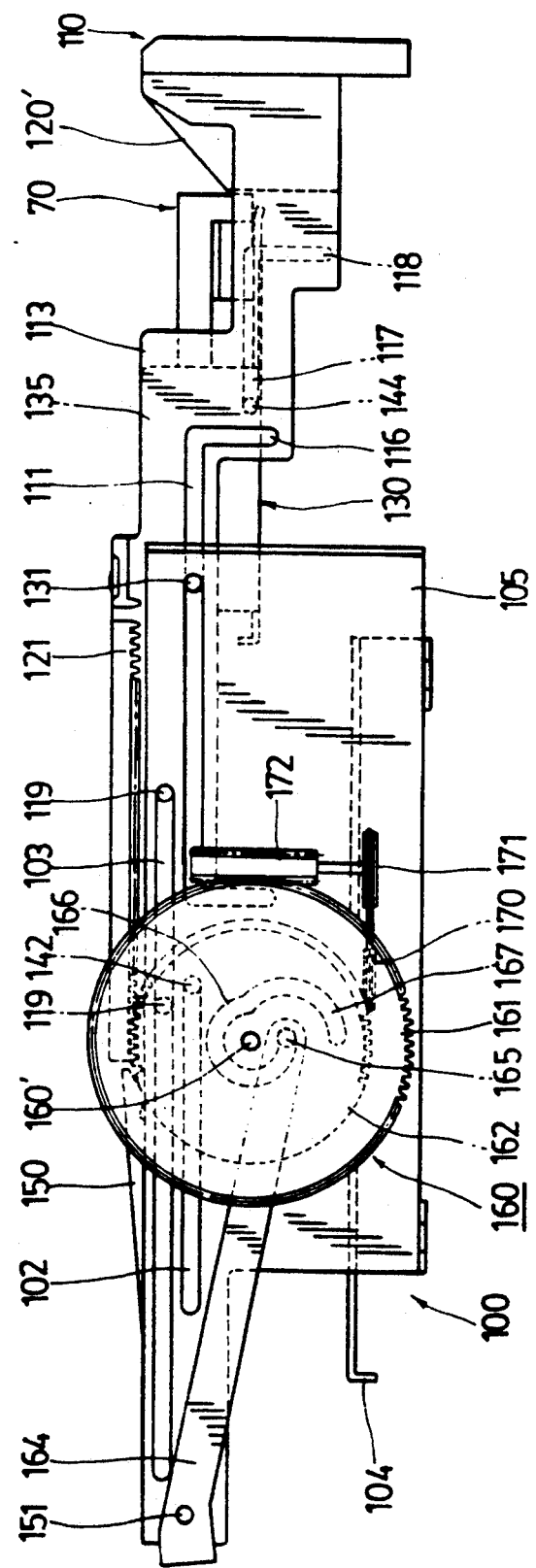

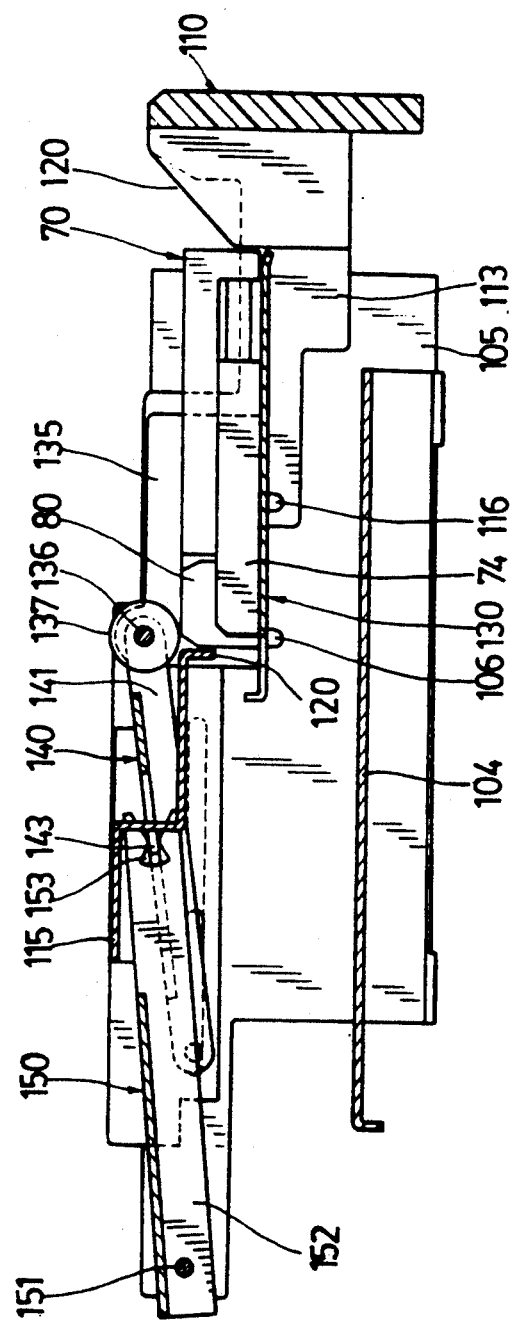

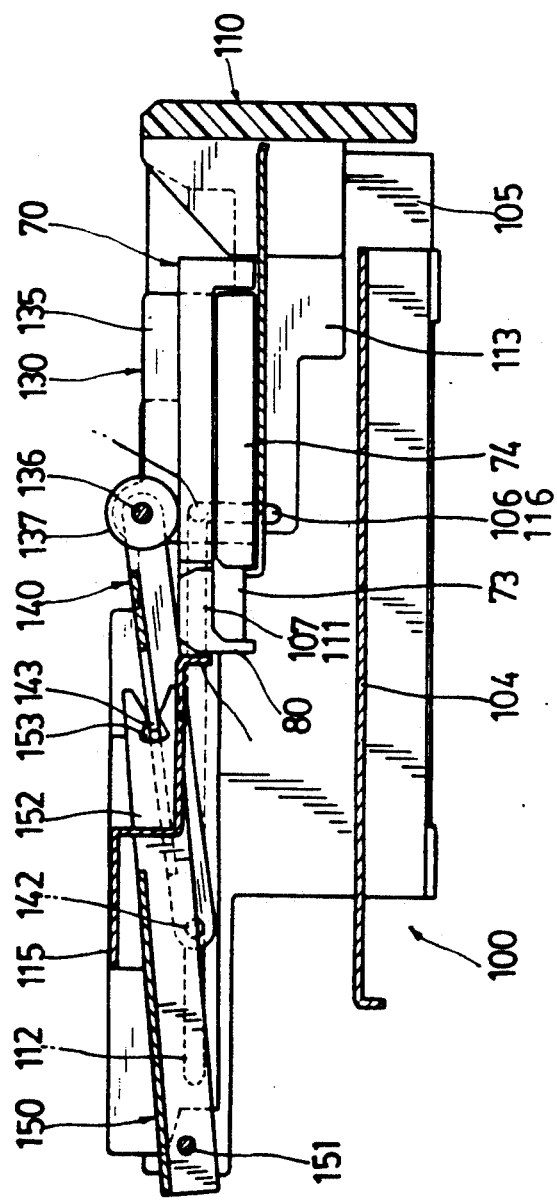

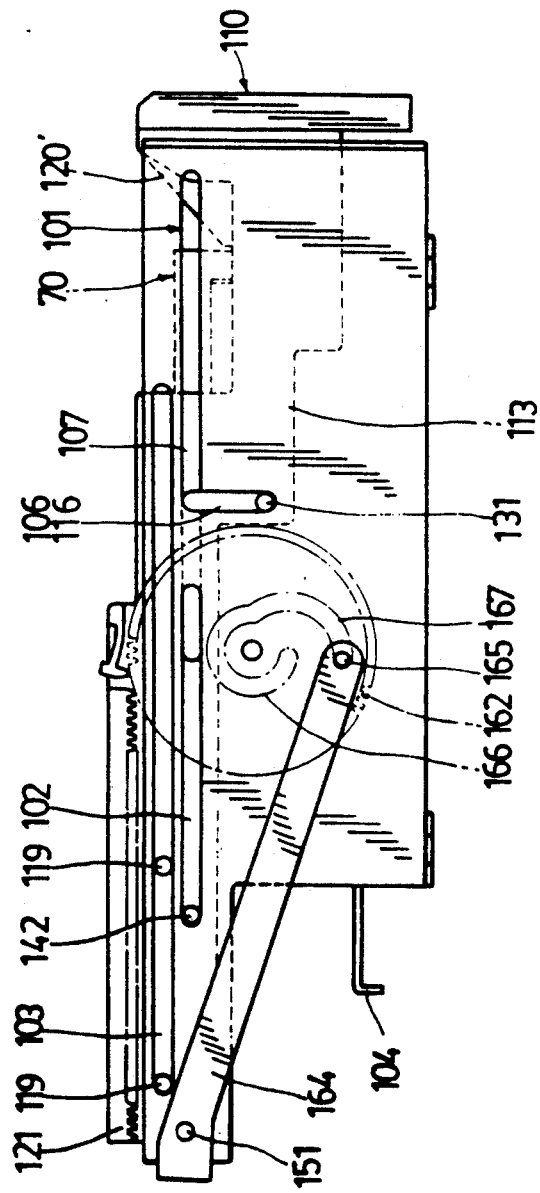

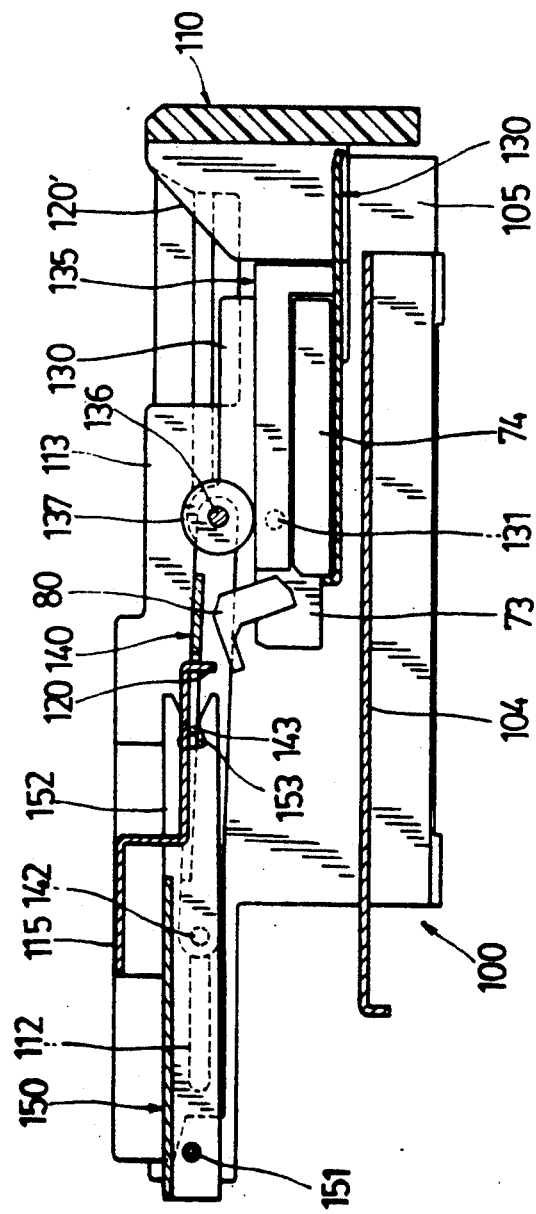

CASSETTE LOADING APPARATUS FOR DIGITAL AUDIO TAPE RECORDER

This is a continuation of application Ser. No. 273,412, filed Nov. 18, 1988, now U.S. Pat. No. 5,060,094.

BACKGROUND OF THE INVENTION

The present invention relates to a cassette loading apparatus for digital audio tape recorder (DAT), specifically relates to a cassette front loading apparatus for a DAT with a tray type loading by moving a cassette horizontally and vertically.

A conventional DAT is formed such that a tape cassette contained with an audio tape is positioned on reel tables within an interior of the apparatus, a tape is drawn out of a cassette and applied to a rotary head drum, thereafter a tape is driven to run by a driving force of a capstan motor, thereby record and reproduction of the tape can be executed. In such a DAT, a practical form of a conventional cassette front loading apparatus for moving a tape cassette from the exterior to the interior of an apparatus will be explained in detail in accordance with FIGS. 1 to 3 as follows.

In the drawings, the reference numeral 1 is a base plate, 2 is a cassette tray moving reciprocally and linearly against the base plate 1, 3 is a cassette holder which carries a DAT cassette 70 (refer to FIGS. 4 and 5) by moving with the tray 2, 4 is a loading motor for loading the cassette tray 2 and the cassette holder 3, 5 is a cassette lift and drop motor which moves downwardly as much as a predetermined length successively from the state that the cassette holder 3 is finished the horizontal movement, 6 is a slider opening plate which opens a slider 74 of a cassette 70, 7 is a push lever which properly and safely sets said cassette 70 into the cassette holder 3 in case of loading a cassette 70, 8 is a take out level which takes out said cassette 70 from the cassette holder 3 in case of loading a cassette 70, 9 is a driving gear which transfer the driving force of the cassette lift and drop motor 5, 10 is an opening operation plate which actuates the slider opening plate 6 by being coupled with said driving gear 9, and 11 represents a lift and drop operation plate which drops the cassette holder and the cassette 70 by being coupled with said driving gear 9, respectively.

To said base plate 1 are fixed tightly with guide bars 12 at the side edge portion, to both side plates 13 of said cassette tray 2 are arranged with linear bearings 14 which the guide bars 12 are inserted so that a cassette tray 2 moves linearly riding along the guide bars 12.

to the side plates 15 of said cassette holder 3 are movably connected respectively with the rotation levers 16 by connecting pieces 17 and each rotation levers are rotatably fixed at the both side plate 13 of the cassette tray 2 by axial pins 18, to the axial pins 18 there are fixed with torsion springs 19 supporting resiliently the rotation levers 16 in clockwise.

Aforesaid loading motor 4 is fixed to the base plate 1, at the bottom of the base plate 1 there are fixed with a pulley 22 which is connected to a pulley 21 with a pulley 20 fixed to a shaft of the loading motor 4, a gear 24 connected to a gear 23 formed integrally therewith, a pulley 25' connected by a wire 26 to a pulley 25 formed integrally therewith, and said wire 26 is connected with connecting pieces 27 fixed to said cassette tray 2. Therefore, the cassette tray 2, cassette holder 3, rotation lever 16 and take out lever 8 can be moved together linearly.

Aforesaid lift and drop motor 5, to which shaft a pulley 28 is fixed, is connected to a pulley 30 formed integrally with a worm 29 by a belt 31, and the worm 29 is meshed with the driving gear 9. At the lower surface of the driving gear 9, a small gear having a cam groove 33 at the peripheral surface thereof is integrally formed and is meshed with a rack 34 formed at a side edge portion of said lift and drop operation plate 11. At the lower portion of the driving gear 9, a cam lever 36 is rotatably mounted with a shaft pin 35 and a cam pin 37 provided on the upper surface of the cam lever 36 is inserted into the cam groove 33 of the driving gear 9 and, at the same time, another cam pin 37' is inserted into a rectangular guide hole 39 of said opening operation plate 10 through a pierced hole 38 formed at the base plate 1, and the cam lever 36 and the opening operation plate 10 are connected by a tension spring 40.

To said opening operation plate 10 is connected with said slider opening plate 6 by a shaft 41, said slider opening plate 6 and the opening operation plate 10 are connected with a tension spring 42, and the slider opening plate 6 is formed with a cassette hooking piece 43 at a front end portion and a contacting piece 44 is formed at rear portion, thereby the contacting piece 44 is allowed to couple with contacting to a 2-stage cam step portion 45 having an inclined plane of said lift and drop operation plate 11.

At a side of the lift and drop operation plate 11 of said base plate 1 there is fixed with a rotation relay lever 46 by a shaft 48 at a supporting piece 47 protruded from the base plate 1, at the same time it is urged by a tension spring 49, in case of the frontward moving of the lift and drop operation plate 11, it is formed such that it is pushed by its protrusion 50 and accordingly with rotating, it renders to rotate said rotation lever 16.

Aforesaid push lever 7 is formed such that when said cassette tray 2 is loaded, it rotates with contacting to a contact plate 51 which is formed by being bent downwardly at a frontward portion of the base plate 1, and it is allowed to rotate a push bar 52 through the gear and the coupling movement mechanism of the cam.

Aforesaid cassette take out lever 8 is fixed by a shaft pin 54 at a supporting plate 53 fixed between both side plates 13, 13 of the cassette tray 2, said take out lever 8 and the supporting plate 53 is connected with a tension spring 55 which urges the take out lever 8 in counter clockwise resiliently, and it is formed such that an inclined cam 56 is fixed at predetermined portion of the base plate 1 so that the take out plate 8 is slided.

Aforesaid loading motor 4 and cassette lift and drop motor 5, whose rotating direction or whether to stop or not etc. are determined in accordance with the combination of ON.OFF signals of the first, second, third and fourth location detecting switches 61, 62, 63, 64 fixed respectively at a predetermined location of the base plate 1.

FIGS. 4 and 5 show a DAT cassette, as shown in the drawings, a tape cassette 70 is established such that a slider 74 can be opened and closed in sliding manner to a main body 73 which a magnetic tape 71 is wound at reels 72 and contained therein, the reel hub exposing holes 75 are formed on the both sides at a main body 73, to a slider 74 is formed with a pierced hole 76 which is corresponded to the reel hub exposing hole 75 of the main body 73 in case of opening, and at both sides of the pierced hole 76 is formed respectively with a guide hole 77 which the release protrusion 57 of said cassette holder 3 is inserted, at the same time to the guide holes 77 of both sides is formed respectively at front portion with a lock hole 79 which a locker 73 protruded from the interior of the main body 73, a protect cover 80 is coupled by a hinge to the main body 73, to which protect cover 80 there is formed with a groove 81 which the hooking piece 58 of said cassette holder 3 is inserted.

A DAT cassette like this, is loaded and unloaded into the interior of DAT by said front loading apparatus, the loading operation is executed by a step which it is carried on the cassette holder 3 and moved as long as predetermined distance into the interior of the apparatus and by a step which it is moved vertically and set safely and properly to the reel table mounted at the base plate 1, the slider 74 is opened in time of horizontal movement and the protecting cover 80 is opened in time of vertical movement.

Hereinbelow, explaining more specifically the loading and unloading operation of a cassette in accordance with the conventional cassette front loading apparatus as described hereinbefore as follows.

FIGS. 1, 2 and 3A show the state that a cassette tray is ejected, at this moment a protrusion 59 of the connecting piece 27 fixed at a cassette tray 2 is contacted to a first location detecting switch 61 and becomes ON and the loading motor 4 is stopped.

In this condition, a cassette 70 is put in a cassette tray 2 and when the cassette tray 2 is slightly pushed into the innerward (into the rearward), the first location detecting switch 61 becomes OFF and the loading motor 4 rotates positively, with that power the cassette tray 2 together with the cassette holder 3 and the cassette 70 are pushed into innerward, the push bar 52 moves from the guide hole 60 of the cassette tray 2 trough the gear and the coupling movement mechanism of the lever in accordance with the push lever 7 being contacted to the contact plate 51 and then rotated, the cassette 70 is pushed by push bar 52 and is slightly moved inwardly and the release protrusion 57 of the cassette holder 3 is inserted to its guide groove 77 and the lock of slider 74 is released, at the same time the hooking piece 58 is inserted to the inserting hole 81 to which hooking piece 58 the front edge portion of slider 81 is hooked up, and it is supported stably by which the top surface is pressed with the rubber pressing roller 65 fixed adjacent to the connecting piece 15 of cassette holder 3. After the cassette 70 is set stably to the cassette holder 3 in this condition the cassette tray 2, cassette holder 3 and cassette 70 are moved continuously to inward by the driving power of the loading motor 4, when the protrusion 66' formed at a side plate 13 of cassette tray 2 actuate the second location detecting switch 62 and becomes ON then the loading motor 4 is stopped and the horizontal movement of the cassette tray 2 is completed, subsequently the cassette lift and drop motor 5 is rotated and the worm 29 and driving gear 9 are rotated and then the lift and drop driving plate 11 meshed with the small gear 32 of the driving gear 9 is moved frontwardly and then its protruded piece 66 is left away from the third location detecting switch 63 and the third location switch 63 becomes OFF, in accordance to the lift and drop operation plate 11 being moved, the contact piece 44 of the slider opening plate 6 contacted to which cam step portion 45 is lifted up, and the slider opening plate 6 is rotated in counterclockwise (based on FIG. 1) around the shaft 41 and contacted to the top surface of the cassette 70, in accordance with the driving gear 9 being rotated continuously by the driving power of driving motor 5, the lift and drop plate 11 is kept moving frontwardly at the same time the opening operation plate 10 is moved rearwardly by the operation of the cam lever 36 and the cam groove 33 of the bottom surface of driving gear 9 and the slider opening plate 6 are moved together rearwardly, thus the slider opening plate is moved, and whose hooking piece 43 hooks the cassette main body 73 and moves, therefor the cassette main body 73 is moved together, at this moment the slider 74 is hooked to the cassette holder 3 and the movement is stopped according to the slider 74 being opened and hose pierced hole 76 and the reel hub exposing hole 57 of main body 73 being coincided each other.

Thereafter, in accordance to the driving gear being kept rotating, the cam lever 36 cooperatively moving along with the cam groove 33, whose pin 37 is contacted to the concentric circle portion of the cam groove 33 and the rotation is stopped at the same time, accordingly the opening operation plate 10 and the slider opening plate 6 also are stopped, but the lift and drop plate 11 is allowed to keep moving frontwardly as in FIG. 3B, the protrusion 50 of which lift and drop plate 11 makes to rotate the rotation relay lever 46, in accordance to the rotation relay lever 16 being made the rotation lever 16 to rotate, the cassette holder 3 connected thereto is moved downwardly and vertically and is set stably on the reel table coupled to the predetermined portion of the base plate 1, at this moment the protrusion 67 protruded at the lift and drop plate 11 actuates the fourth location detecting switch 64 then the cassette left and drop motor 5 is made to stop.

In the above described process, summarizing the operation of the location detecting switches, if the state that the first to fourth location detecting switches 61–64 are depressed is supposed to be ON, in case of ejecting when the first location detecting switch 61 is ON then the loading motor 4 and the lift and drop motor 5 is got to stop; when the first location detecting switch 61 is OFF and the third location detecting switch 63 is ON then the loading motor 4 is got to positively rotate and continues to rotate until the second location detecting switch 62 becomes ON; when the second location detecting switch 62 becomes ON in the state that the third location detecting switch 63 is ON then the loading motor 4 is got to stop and the lift and drop motor 5 is rotated positively and the cassette 70 is got to set on the reel tables. When the cassette is set then the fourth location detecting switch 64 becomes ON by the protrusion 67 of the lift and drop operation plate 11 and the lift and drop motor 5 is got to stop and becomes to recognize the state of the cassette 70 being set.

Within the state that the cassette 70 is set on the reel tables, the tape 71 contained in the cassette 70 is drawn by the tape running mechanism and is applied to a rotary head drum and getting it to run by the driving power of the capstan motor, the recording or reproducing is executed (the rotary head drum, capstan motor and tape running mechanism are not shown in drawings).

After the play and record are executed as described above, in case when it is intended to eject, it is executed by the reverse operation procedure of abovementioned operation procedure, which is composed of such that when the cassette tray 2 is moved frontwardly and horizontally, the contact piece 68 of the take out lever 8 connected thereof is contacted to the inclined cam 56 fixed to the base plate 1 and is rotated in clockwise around the shaft pin 54, and the cassette 70 which the take out piece 69 is adhered with pressure to the cassette holder 3 by the rubber pressure roller 65 is pushed out slightly to forward so that a user can easily take out the cassette 70.

Since a conventional DAT front loading apparatus as described above uses the loading motor in order to move horizontally the cassette holder and cassette, and it uses the lift and drop motor in order to move vertically the cassette holder and cassette, accordingly both of the loading and unloading motors are required for loading and unloading of the cassette, and since it is formed with very much complicated structure that a device for setting stably the cassette at the cassette holder, a device for moving the cassette horizontally, a device for opening the slider, a device for lifting and dropping the cassette, a take out device for taking out so as to take out the cassette easily from the cassette holder, and the location detecting switch device; since all of these are requiring so many parts, there are the disadvantages that a productivity is decreased and the manufacturing cost is increased.

SUMMARY OF THE INVENTION

Therefore, the object of the present invention is to solve the conventional disadvantages of the prior art apparatus described above, and to provide a cassette front loading apparatus of DAT which without utilizing the separate loading and unloading motor for loading and unloading the cassette, it is made possible to execute by utilizing a capstan motor and the mechanism is very much simplified.

Another object of the present invention is to provide a cassette front loading apparatus of DAT which in accordance with a rack formed to the driving mechanism and cassette tray being cooperatively moved by the driving power of the capstan motor, the cassette tray, cassette holder and cassette are supported with the guide holes of both side brackets fixed tightly at both sides of the base plate and executed with the horizontal guided movement, at a stage that the cassette tray is horizontally moving, the cassette tray is moved with an over stroke as long as predetermined length and then the slider is opened so that the horizontal moving mechanism of the cassette and the slider opening mechanism are simplified.

Further object of the present invention is to provide a cassette front loading apparatus of DAT which at a state that the cassette holder and cassette are completed the horizontal movement, the cam lever and turning plate cooperatively connected to the cam groove of internal surface of said driving gear is turned and accordingly the cassette holder is moved downwardly and vertically so that the lift and drop mechanism is simplified.

Still another object of the present invention is to provide a cassette front loading apparatus of DAT which in case of the cassette ejecting, at a state that the cassette holder is completed the horizontal movement, the cassette tray is moved with an over stroke as long as predetermined distance and then the protrusion of supporting plate fixed thereof pushes the cassette and makes to take out from the cassette holder so that the cassette take out mechanism is simplified.

Still further object of the present invention is to provide a cassette front loading apparatus of DAT which a leap switch fixed at a side bracket of base plate is operated by the switch lever operated by the guide piece of the cassette holder and then the operating location of mechanism is detected and accordingly the driving of the capstan motor is controlled so that the location detecting switch device of the mechanism is simplified.

BRIEF DESCRIPTION OF THE DRAWINGS

FIGS. 3A and 3B are sectional views showing the cassette lift and drop mechanism of FIG. 1.

FIG. 5 to FIG. 11 show the structures and operations of a cassette front loading apparatus according to the present invention, in which;

FIG. 5 is an exploded perspective view of a whole of same as above.

FIGS. 6A and 6B are respectively a side view and a sectional view showing a state before the cassette is loaded.

FIGS. 7A and 7B are respectively a side view and a sectional view showing a state immediately before the slider of the cassette being taken off after the horizontal movement of the cassette holder is completed during the process of the cassette being loaded.

FIGS. 8A and 8B are respectively a side view and a sectional view showing a state immediately before the cassette moves vertically after the cassette tray is moved with an over stroke and then the slider is taken off at a state that the horizontal movement of the cassette holder is completed.

FIGS. 9A and 9B are respectively a side view and a sectional view showing a state that the cassette loading is completed.

FIGS. 11A, B and C are the side views which show the location detecting switch mechanism according to the present invention, in which;

FIG. 11A is a side view showing a state which the upper terminal and intermediate terminal of the leap switch are connected at a state that the cassette tray being ejected.

DETAILED DESCRIPTION OF THE INVENTION

Figure 1:
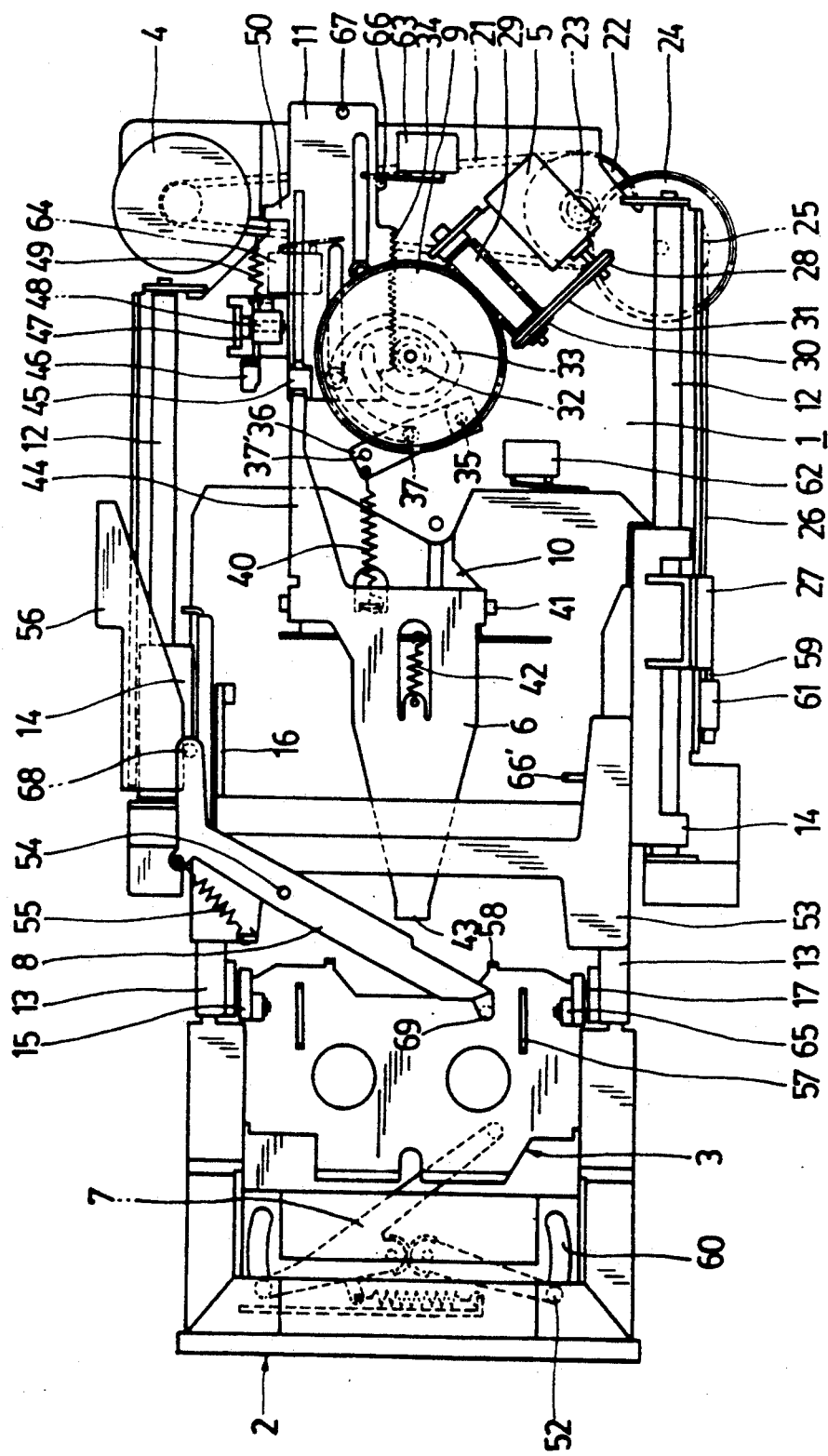
FIG. 1 is a top view of a conventional cassette front loading apparatus which is shown at a state that a cassette tray is ejected.
Figure 2:
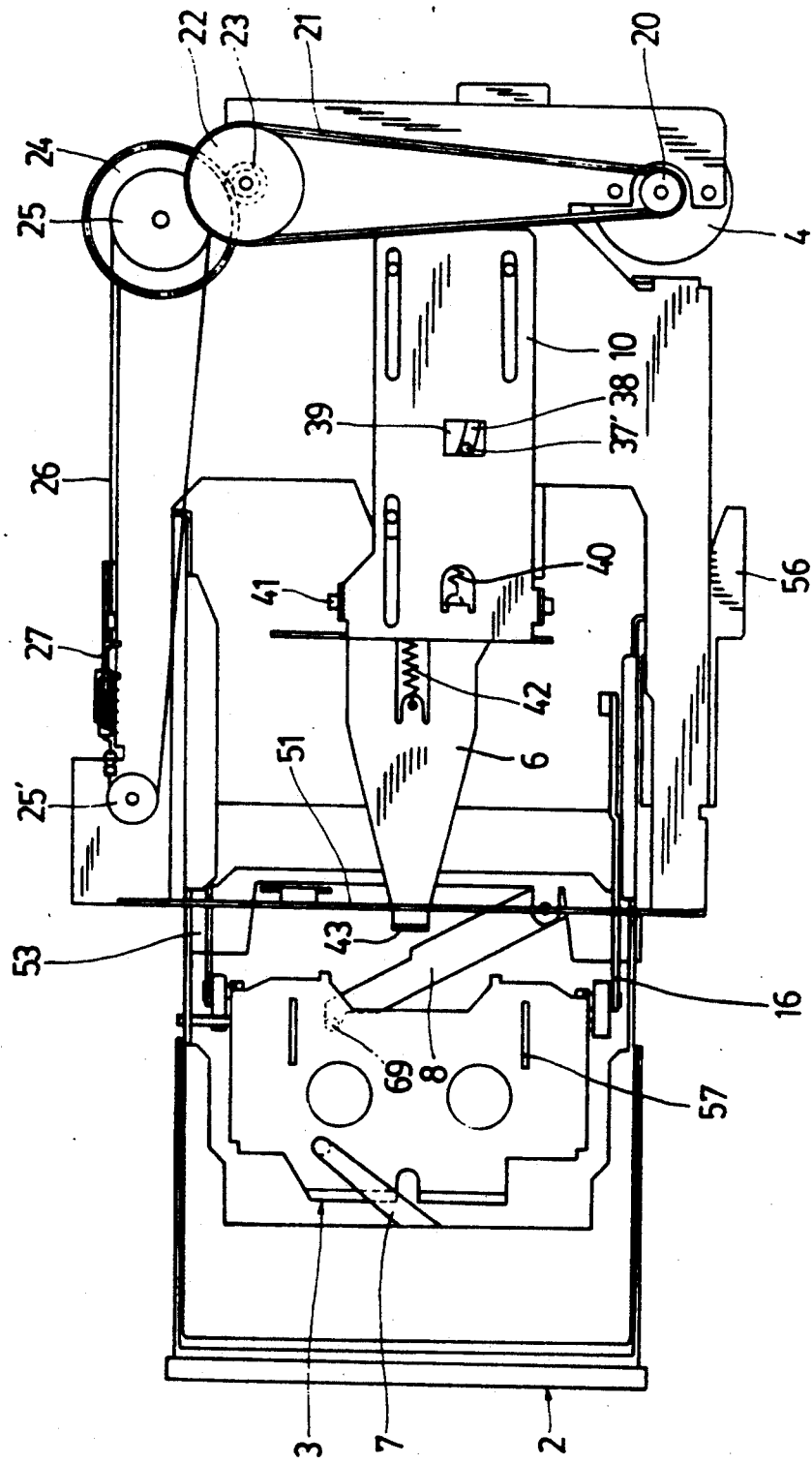
FIG. 2 is a bottom view of FIG. 1.
Figures 4A, 4B:
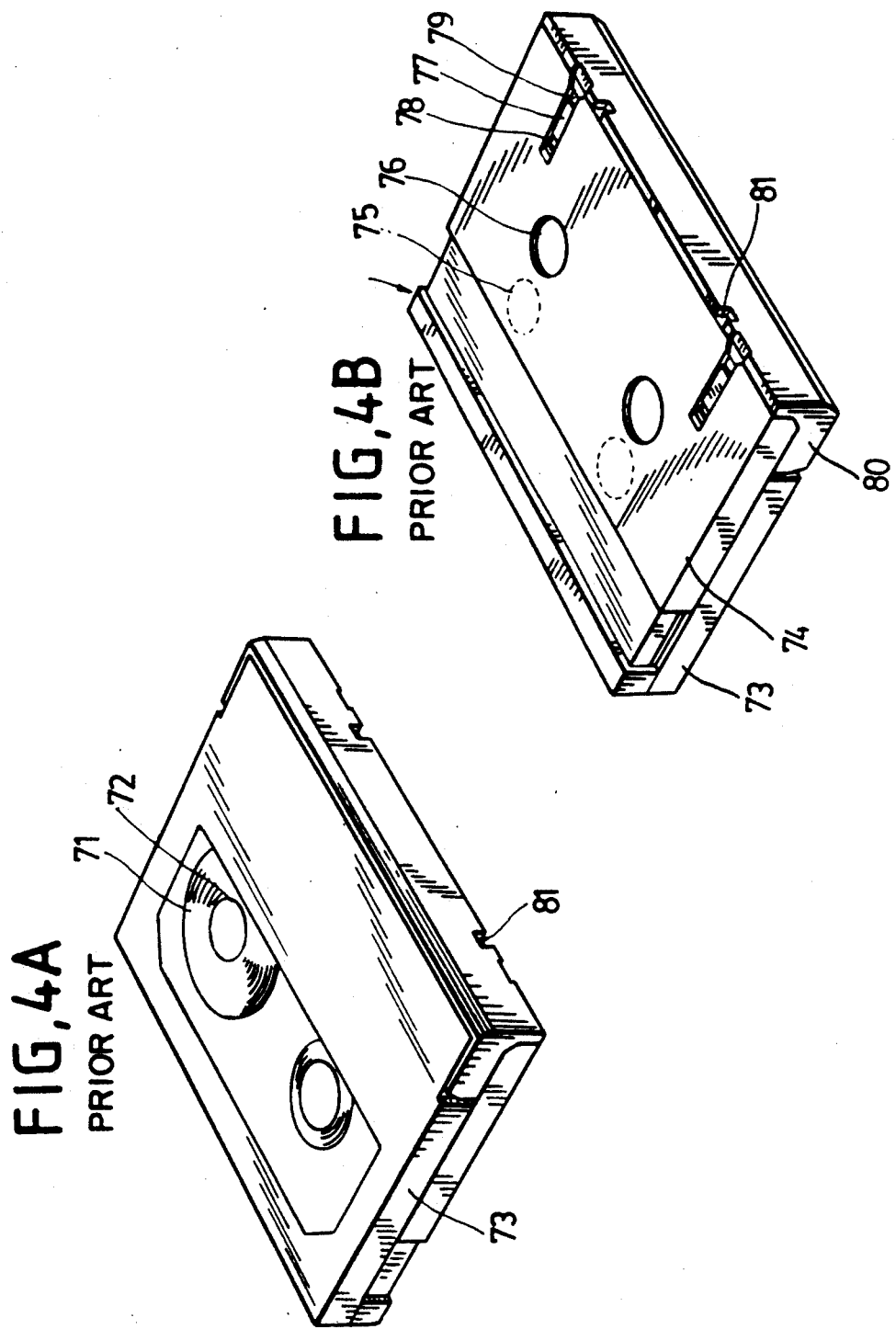
FIGS. 4A and 4B are perspective views of a conventional DAT cassette.
Figure 5:
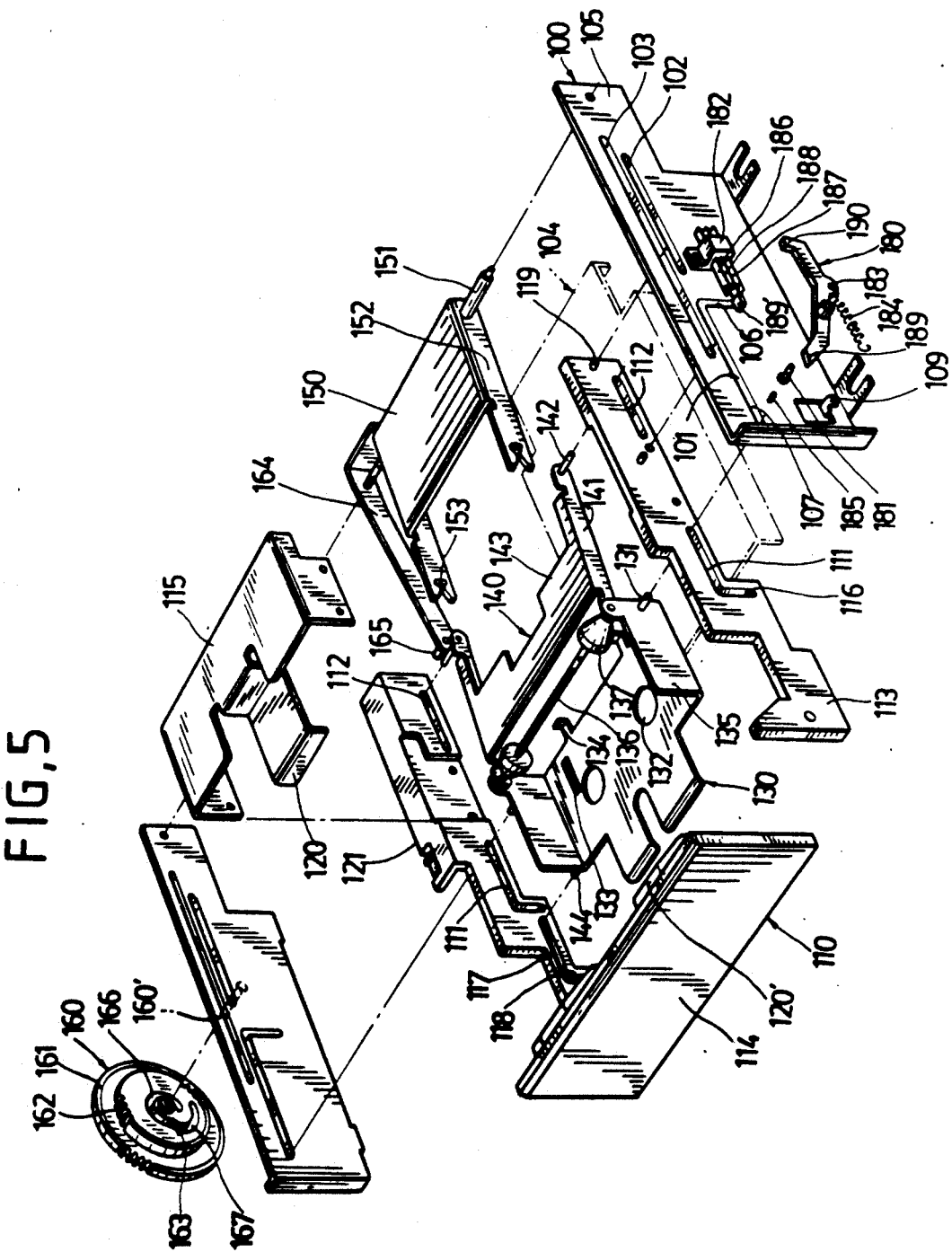

Hereinafter, explaining the present invention described as above more in detail with reference to the accompanying drawings FIG. 5 to FIG. 11 as follows.

The cassette front loading apparatus for a DAT according to the present invention comprises a main body 100, a cassette tray 110 which linearly moves inwardly of which main body 100, a cassette holder 130 and a lift and drop plate 140 arranged at which cassette tray 110, and a rotating plate 150 mounted at rearward portion of said main body 100.

Aforesaid main body is structured such that a pair of brackets 105 are fixed at both side portions of a base plate 104 and first and second guide holes 101 and 102 are respectively formed on a same straight line, and the third guide hole 103 is formed long at the upper side, and a vertical portion 106 is formed integrally in perpendicular crossing at the rear end portion of the first guide hole 101.

Aforesaid cassette tray 110 is structured with both side slider plates 113 located at the inner side of the bracket 105, and a door 114 mounted at which front end portion, and a supporting plate 115 fixed at intermediate portion.

At said both side slider plate 113, the first guide holes 111 and second guide holes 112 are formed on a semi straight line, a vertical portion 116 is formed integrally so as to be crossed perpendicularly at the rear end portion of the first guide holes 111, and the guide pine 119 fixed at both side slider plates 113 are inserted into the third guide hole 113 of said bracket 105.

A pair of pierced holes 132 are formed at said cassette holder 130, a release protrusion 133 and a hooking piece 134 are respectively formed at the rearward portions of the pierced holes 132, the guide pins 131 fixed at a center of the rearward portion of both side surfaces 135 of the cassette holder 130 are inserted to the first guide holes 111, 101 of said slider plate and bracket 105, and a guide pin 144 formed at the lower side of the frontward portion of a side surface 135 is inserted to the guide hole 117 formed at the internal surface of a side slider plate 113. A guide hole 117 is formed integrally with the vertical portion 118 at the end portion as a first guide hole 111.

Aforesaid lift and drop plate 140 is formed with a guide pin 142 at the rear end portions of both side surfaces 141, whose guide pins 142 are respectively inserted to the second guide holes 112, 102 formed at said slider plate 113 and bracket 105, and both side surfaces 141 of the lift and drop plate 140 and both side surfaces 135 of the cassette holder 130 are connected by a shaft bar 136, and a rubber pressure roller 137 for supporting the cassette 70 is secured to the shaft bar 136.

Aforesaid guide pins 131, 142, 144 and 119 support the cassette holder 130, the lift and drop plate 140 and the cassette tray 110 at the bracket 105 of the main body 100, and guide their horizontal movement, and guide the vertical movement of the cassette holder 130. And the guide pins 131, 142 can move horizontally together with the cassette holder 130 and the lift and drop plate 140 as long as the length of the first guide hole 101 and second guide hole 102 of both side bracket, and their movement become to stop when the guide pins 131, 142 contact to the front end portion or rear end portion of the first, second guide holes 101, 102 of the side brackets 105, and this cassette tray 110 can further move to outside or to inside as long as the length of horizontal portion of the guide groove 117 and the first, second guide holes 111, 112 formed at both slider plate 113. That is to say, the horizontal length of the guide groove 117 and the first, second guide holes 111, 112 render possible the over stroke of the cassette tray.

A take out protrusion 120 is formed at the intermediate portion of the supporting plate 115 of said cassette tray 110, and a draw in protrusion 120' is fixed at both side on the internal surface of a door 114 of the cassette tray 110.

A driving gear 160 which has a large gear 161 and a small gear 162 to which internal surface a cam groove 163 is formed, is fixed by a shaft pin 160' at a side bracket 105 of said main body 100, a rack which is formed longitudinally at a side slider plate 113 of the cassette tray 110 is meshed with the small gear 162 of the driving gear 160, a worm 172 which rotates by receiving through a power transmission means 171 the driving power of the known capstan motor 170 mounted at the base plate 104 of the main body 100 at the large gear 161, is meshed.

As for said power transmission means, the pulley, belt and gear train etc. can be utilized, and whose structure also can be constructed with variety.

Aforesaid turning plate 150 is fixed at the intermediate portion of the shaft bar 151 fixed rotatably at the rear end portion of both side brackets 105 of the main body 100, at both side surface 152 of which turning plate are respectively formed with the connecting grove 153 which the connecting portion 143 of said lift and drop plate 140, at a side surface 152 of the turning plate 150 is fixed with the cam lever 164.

At the front end portion of which cam lever 164 is fixed with a slide pin 164 thereby is inserted into the internal cam groove 163 of the cam gear 160.

In addition, at the lower side of the guide hole 101 of the other side bracket 105 front portion of said main body 100, the switch lever 180 is fixed with the axle pin 181 and a leap switch 182 is fixed adjacently, a tension spring 184 is fixed which urges resiliently the switch lever 180 in clockwise at the protrusion 107 of the other side bracket 105 and the protrusion 183 of the switch lever 180, and a stop pin 185 which controls the revolution is fixed at the upper side of the switch lever 180.

Aforesaid leaf switch 182 if formed with the upper and lower terminals 186 and 187 and intermediate terminal 188, and the front end contact portion 189 of the intermediate terminal 188 is located at the vertical portion 106 of the first guide hole 101.

Aforesaid switch lever 180, at a state that the cassette tray 110 is ejected, whose front end portion 189 is contacted and pressed to the first guide pin 131 of the cassette holder 130, whose rear end portion 190 pushes up the intermediate terminal 188 of the leaf switch 182, accordingly the upper terminal 186 and the intermediate terminal 188 of the leap switch 182 is connected.

Hereinafter, explaining the operation and effect of the present invention as follows.

Figure 6B:
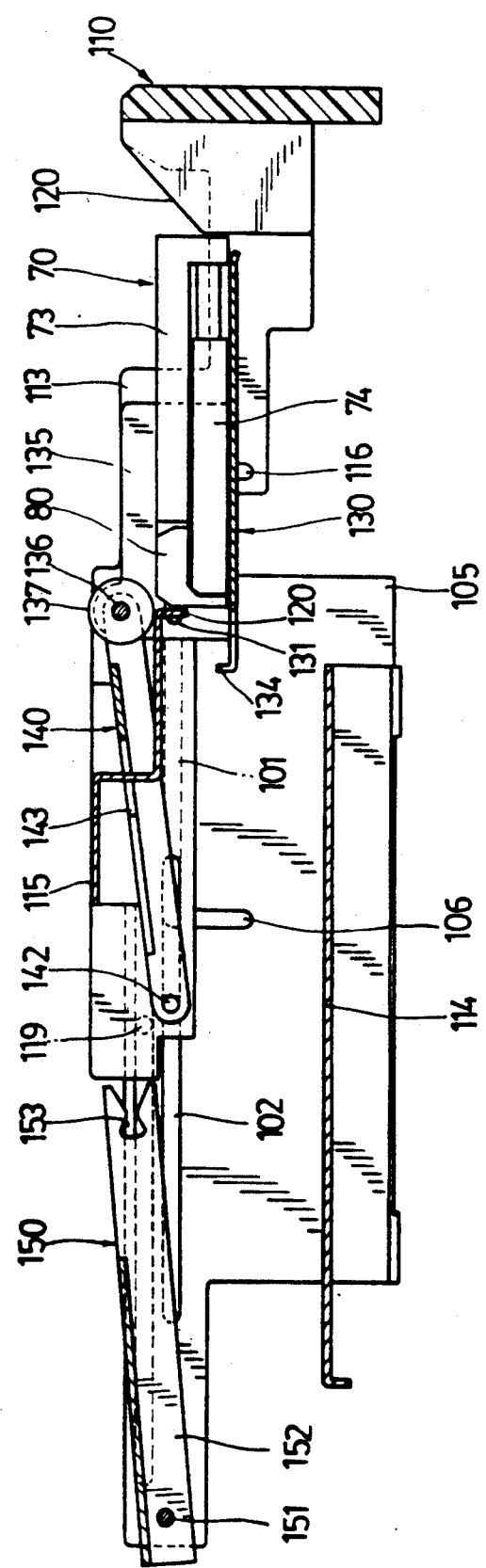
Figure 11A:
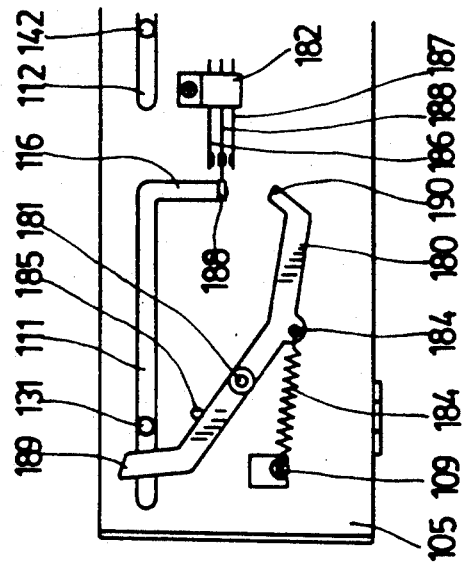

FIGS. 6A and 6B show the state that the cassette tray 110 is completely opened at the main body 100, in this state, the guide pin 131 of the bracket 105 and the guide pin 142 of the lift and drop plate 140 are contacted at the right side end portion of the guide holes 101, 102 of bracket 105, as shown in FIG. 11A the guide piece 131 of cassette holder 130 presses the front end portion of the switch lever 180, so that its rear end portion 190 pushes the intermediate terminal 188 of the leaf switch 182 upwardly then the intermediate terminal 188 and the upper terminal 186 are contacted therefore the electric power is cut off to the capstan motor 170, thus when the intermediate terminal 188 and the upper terminal 186 are connected and they become ON, then the DAT syscon (DAT system control micro processor) recognizes that the cassette tray 110 is in the open state. In addition at this state, the pin 165 fixed at the front end portion of said cam lever 164 is located at the concentric circle portion 166 of the cam groove 163 formed at the driving gear 160.

Figure 11B:
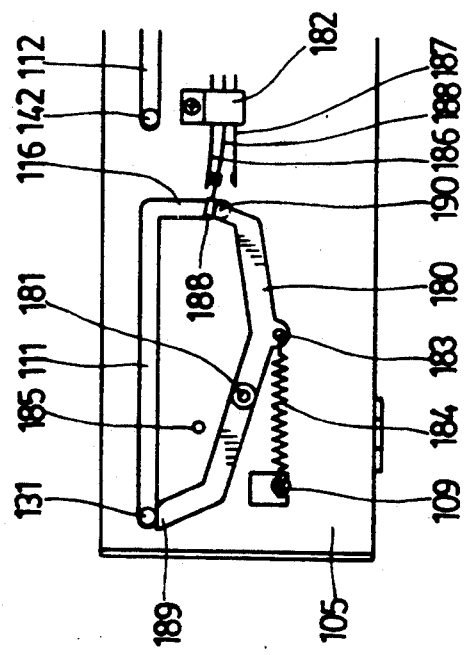
FIG. 11B is a side view showing a state which the intermediate terminal and the upper and lower terminal of the leap switch are separated in case of the cassette tray being loaded.

Thus, at a state that the tray 110 is opened, when the cassette 70 is put in to the cassette holder 130 and the cassette tray 110 is pushed to the interior a little, the guide piece 13 of cassette holder 130 becomes pushed to the interior thereby the switch lever 180 is turned around the axle pin 181 by the tension spring 184 as in FIG. 11B and whose rear end portion 190 becomes taken off from the intermediate terminal 188 of the leaf switch 182, therefore the intermediate terminal 188 is changed to a neutral position and left away from the upper terminal 186 and then becomes OFF, and the switch lever 180 is restricted so as not to turn any more by being caught to a stop pin 185.

Thus, when the upper terminal 186 and the intermediate terminal 188 of the leaf switch 182 is separated and they become OFF, the electric power is supplied to the capstan motor 170 and it turns, the driving gear 160 cooperatively coupled to the worm 172 turns counterclockwise, and the cassette tray 110 meshed with the rack 121 to the small gear 162 of driving gear 160 moves to inward.

Figure 7A:
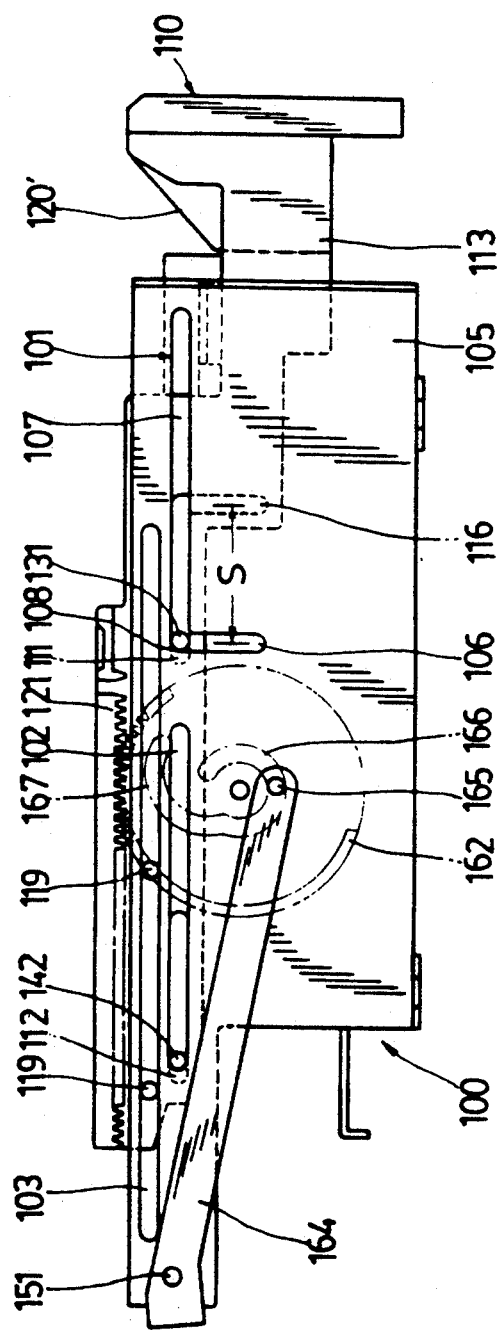
Figure 8A:
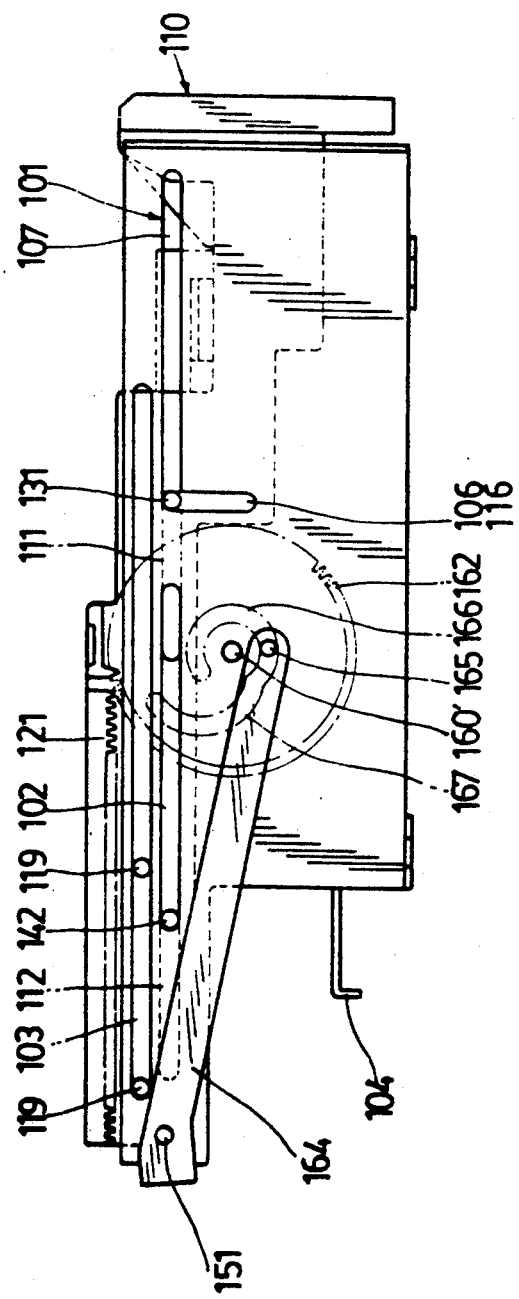

Thus, the cassette tray 110 moves inwardly and the lift and drop plate 140 and the cassette holder 130 contained with the cassette 70 move together horizontally, and as shown in FIGS. 7A and 7B the guide pin 131 of the cassette holder becomes to touch at the bent portion 108 which is the intermediate portion between the horizontal portion 107 and vertical portion 106 of the first guide hole 101 formed at the bracket 105.

When it becomes thus, the cassette holder 130 and the lift and drop plate 140 is no more able to be moved inwardly and is stopped, and a distance for opening the slider 74 of the cassette 70 as long as S is held between the vertical portions 106, 116 of the first guide hole 111 of the tray and the first guide hole 101 of the bracket. At this state, when it is moved more inwardly in accordance with the continuous revolution of the driving gear 160, then the slider 74 of cassette 70 becomes caught by the hooking piece 134 and can be moved no more, and only main body 70 becomes pushed to the draw in protrusion 120' formed at the interior of the door 114 and moved inwardly, the slider 74 is opened completely until the first guide hole 111 of the tray 110 is moved as long as the distance S and is reached to the state of FIGS. 8A and 8B, at this moment the first guide hole 111 and the vertical portions 116, 106 of the first guide hole 101 of main body become to coincide, at the same time the inserting portion 143 of the lift and drop plate 140 is inserted to the connecting groove 153 of the turning plate 150.

Within the state that became as thus, when the driving gear 160 is turned continuously counterclockwise by the revolutional power of the capstan motor 170, the pin 165 of cam lever 164 is moved with riding along the radius variation portion 167 of cam groove 163, accordingly the cam lever 164 is turned clockwise around the axle shaft 151 and then the turning plate 150 is turned clockwise together with the cam lever 164, in accordance with the turning plate 150 being turned clockwise, the lift and drop plate 140 is turned clockwise around the guide pin 142, and the cassette holder 130 connected with the shaft bar 136 thereto is moved vertically and downwardly, thereby as shown in FIGS. 9A and 9B the cassette 70 contained in said cassette holder 130 is set on the supply reel table and take-up reel table arranged at the base plate 104. Thus, when the cassette holder 130 is moved downwardly, the guide pin 131 of which rear end portion is guided to the vertical portions 106, 116 of guide holes 101, 111 of the tray 110 and main body 100 and the front end guide pin 144 is moved downwardly riding along the vertical portion 118 of the guide hole 117 formed at the internal surface of a side plate 113 of the tray 110, during dropping the protect cover 80 of the cassette 70 is opened by another separate cover opening means (not shown).

Figure 11C:
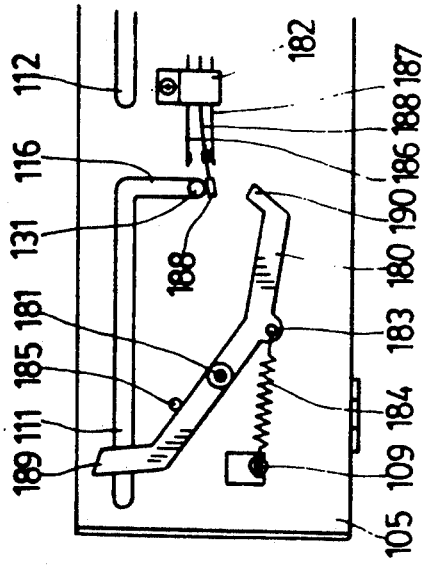
FIG. 11C is a side view showing a state which the intermediate terminal is connected with the lower terminal of the leap switch at a state that the cassette tray being completed to load.

Thus, when the loading of the cassette 70 is completed, in accordance the intermediate terminal 188 of leaf switch 182 being pressed by the guide pin 131 of the cassette holder 130 as shown in FIG. 11C, the intermediate terminal 188 is bent downwardly from the neutral position and connected with the lower terminal 187 and becomes ON and then the electric power becomes to cut off to the capstan motor 170 therefore it is stopped.

Figure 10A:
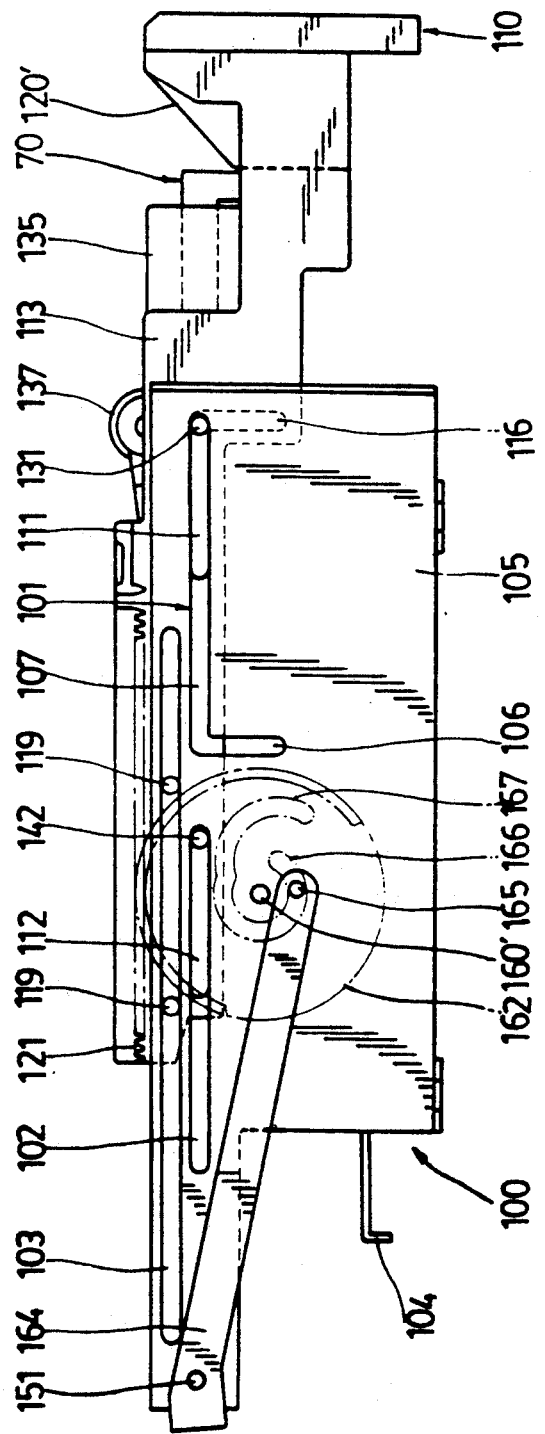
FIGS. 10A and 10B are respectively a side view and a sectional view showing a state immediately before the slider being closed after the horizontal movement of the cassette holder is completed during the process of the cassette being unloaded.
Figure 10B:
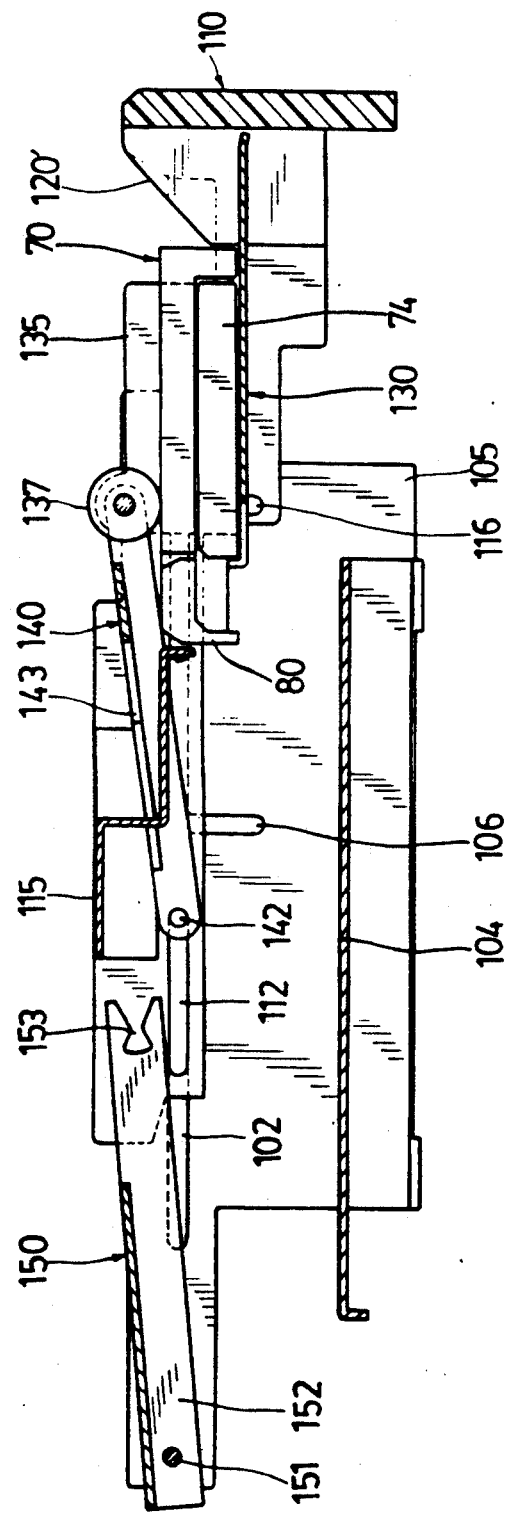

Thus, in a state that the cassette loading is completed, the tape 71 contained within the cassette 70 is made to run by the running drive mechanism arranged to the base plate 104 and so the desired mode such as the play is executed, in case where the cassette 70 is intended to eject, when the separate eject button (not shown) arranged at the exterior of main body 100 is pressed, in accordance with the capstan motor 170 being rotated to the reverse direction and then the driving gear 160 being rotated clockwise, the reverse operation against the above operation is executed therefore the cassette holder 130 is moved vertically to upward thereafter it is moved together with the cassette tray 110 toward the exterior of main body 100, at this moment the take out protrusion 120 of the supporting plate 115 fixed to the cassette tray 110 is moved forward with slightly pushing the cassette 70 on the cassette holder 130. Thus, when the guide pin 131 of the cassette holder 130 is contacted to the right side end portion of the first guide hole 101 of the bracket 105 as shown in FIG. 10, then it can be no more moved forwardly, and the cassette tray 110 becomes to move forward a little more by an over stroke of the guide holes 111, 112 of cassette tray 100, at this moment the support plate 115 fixed with the cassette tray 110 also is moved forward a little more, accordingly the cassette 70 which has been pressed and adhered by the rubber roller 137 formed at the axle shaft of the cassette holder 130 is pushed by the take out protrusion 120 of the supporting plate 115 and it is drawn to the exterior out of the cassette holder 130, so that a user becomes possible to take out easily.

As described hereinabove, since the present invention, without requiring to use separately the loading motor and the lift and drop motor for moving the cassette horizontally and lifting and dropping, the loading and unloading of the cassette can be executed by the existing capstan motor, the cost for establishing the motors is deleted, the horizontal and vertical movement device for the cassette, slider opening device, cassette take out device and the location detecting switch device and the like, the all of mechanism is very much simplified, thereby the number of parts employed are decreased, the part processing work and assembling work can be simplified, therefore there are the advantages that the productivity is outstandingly increased, and that the preciseness management of the products is easy in accordance with the simplified structure and the operation of the mechanism becomes smooth.

What is claimed is:

1. A cassette loading apparatus for a digital audio tape recorder, comprising:
 a main body;
 a cassette holder;
 a capstan motor, a switch for supplying power to said capstan motor, said switch being mounted to be activated, for supplying of power to said capstan motor, by contact with said cassette holder for energizing said capstan motor, coupling means for moving said cassette holder in vertical and horizontal directions, said coupling means comprising;

a drive gear and means coupling said drive gear to said capstan motor, a small gear on a side of said drive gear, said small gear having a cam groove on the side thereof away from said drive gear, and cam lever means coupled to said cam groove for pivotal movement, for urging said cassette holder for movement in a vertical direction, and said cassette holder having a side slider plate with a rack formed thereon, said rack being meshed with said small gear for moving said cassette holder in a horizontal direction.

2. A cassette loading apparatus for a digital audio tape recorder, comprising:

a main body;
a cassette holder;
a rack coupled to said cassette holder;
a capstan motor,
a switch for supplying power to said capstan motor,
coupling means for moving said cassette holder in vertical and horizontal directions, said coupling means comprising;
a drive gear coupled for rotation to said capstan motor,
said drive gear having teeth meshing with said rack for moving said cassette holder in a horizontal direction;
said drive gear having a cam groove; and
a cam lever coupled to said cam groove for pivotal movement, and means coupling said cam lever to said cassette holder for urging said cassette holder to move in a vertical direction.

3. The cassette-loading apparatus of claim 2 wherein said drive gear is mounted laterally of said cassette holder, and the teeth of said rack face downwardly to engage the teeth of said drive gear.

4. The cassette loading apparatus of claim 2 wherein said rack is coupled to said cassette holder by a slider plate, said rack being formed in said slider plate.

5. The cassette loading apparatus of claim 2 wherein said means coupling said cam lever to said cassette holder comprises a turning plate rotatable with said cam lever, and a lift and drop plate pivotally coupled to said cassette holder, said turning plate having a connecting arrangement for engaging said lift and drop plate at a rearward position in the horizontal movement of said cassette holder.

6. The cassette loading apparatus of claim 5 wherein said cam lever and turning plate are pivotally mounted to said main body.

7. The cassette loading apparatus of claim 5 wherein said main body has a guide groove with a horizontal portion joined at its rear end to a downwardly extending portion, and further comprising a guide pin on said cassette holder engaging said guide groove, whereby said guide pin engages said downwardly extending portion at said rearward position in the horizontal movement of said cassette holder.

8. The cassette loading apparatus of claim 2 comprising means responsive to movement of said cassette holder from an open position, at which it can receive a cassette, for operating said switch to supply power to said capstan motor.

9. The cassette loading apparatus of claim 8 wherein said switch is mounted to open said switch when said cassette holder is positioned at its lower position.

10. A cassette loading apparatus for a digital audio tape recorder, comprising:

a main body;
a cassette holder;
a rack coupled to said cassette holder;
a capstan motor,
a switch for supplying power to said capstan motor,
coupling means for moving said cassette holder in vertical and horizontal directions, said coupling means comprising;
a drive arrangement having a gear with teeth meshing with said rack and a rotatable cam,
means coupling said drive arrangement to said capstan motor for simultaneously rotating said gear and cam, whereby rotation of said motor moves said cassette holder in a horizontal direction;
a cam lever coupled to said rotatable cam for pivotal movement of said cam lever, and means coupling said cam lever to said cassette holder for urging said cassette holder to move in a vertical direction.

* * * * *